United States Patent [19]

Mashimo

[11] 4,278,337
[45] Jul. 14, 1981

[54] ELECTRIC MOTOR DRIVE DEVICE FOR CAMERA

[75] Inventor: Yukio Mashimo, Tokyo, Japan

[73] Assignee: Canon Kabushiki Kaisha, Tokyo, Japan

[21] Appl. No.: 8,512

[22] Filed: Feb. 1, 1979

[30] Foreign Application Priority Data

Feb. 7, 1978 [JP] Japan .................................. 53-12745

[51] Int. Cl.³ .......................... G03B 1/18; G03B 7/26
[52] U.S. Cl. ................................. 354/60 R; 354/173; 354/234
[58] Field of Search .................... 354/60 R, 171, 173, 354/266, 234, 235, 267, 268

[56] References Cited

U.S. PATENT DOCUMENTS

| 3,688,669 | 9/1972 | Ogiso et al. | 354/171 |
|---|---|---|---|
| 3,898,679 | 8/1975 | Ogiso et al. | 354/173 |
| 3,946,409 | 3/1976 | Toyoda | 354/173 |
| 4,086,603 | 4/1978 | Kozuki et al. | 354/173 X |

*Primary Examiner*—L. T. Hix
*Assistant Examiner*—William B. Perkey

[57] ABSTRACT

An electric motor drive device for a camera includes an operation switch interlocked with a starting operation member, a memory circuit arranged to memorize the operated movement of the operation member through the output of the operation switch, and an electric motor control circuit which is controlled by the output of the memory circuit. The motor is arranged to be brought into an inhibited state in response to a signal produced by the operation of the operation member and to be released from the inhibited state into a driven state when the memory circuit is inverted by another signal. The latter signal is produced during a returning movement of the operation member in its operation. The memory circuit is provided with a semiconductor switch for allowing power to be supplied to the memory circuit only when it is in operation so as to avoid unnecessary power consumption. The operation of the memory circuit is performed under supply of power received through a constant voltage circuit so as to eliminate the possibility of an erroneous action due to voltage variation which takes place in the power supply when the motor is driven.

7 Claims, 6 Drawing Figures

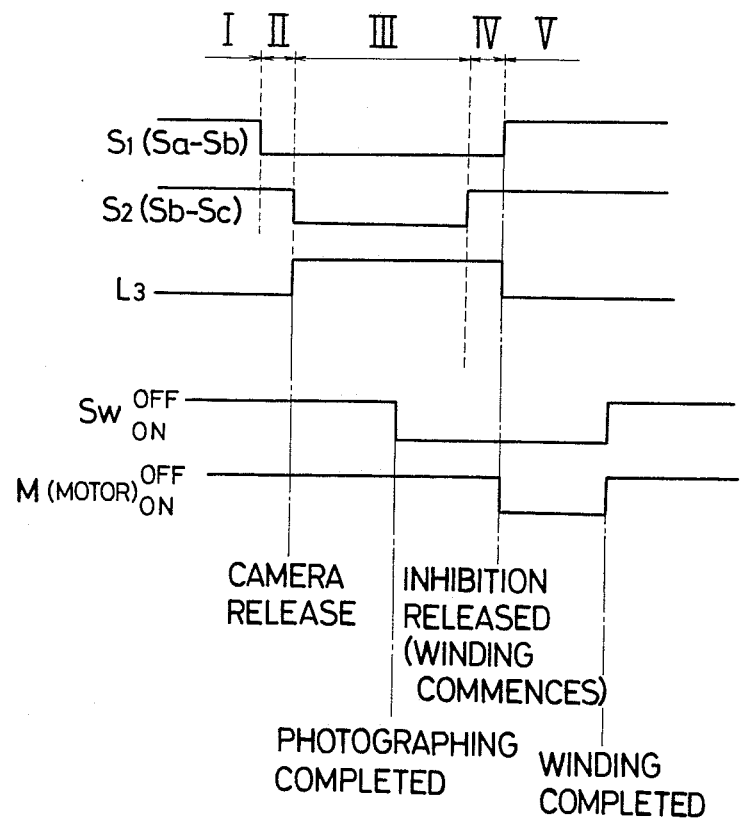

ELECTRIC MOTOR DRIVE DEVICE FOR CAMERA

BACKGROUND OF THE INVENTION

1. Field of the Invention

The present invention relates to an electric motor drive device for a camera and, particularly, to an electric motor drive device which performs a starting action without fail.

2. Description of the Prior Art

Heretofore there have been proposed various kinds of electric motor drive devices for cameras which automatically perform wind-up actions such as a film winding action, a shutter winding action, and the like. Some of these conventional drive devices, which are arranged to be incorporated in the camera, are arranged as an external accessory to be used by mounting it on the camera prior to use. Among the conventional electric motor devices, one type has recently come to be widely used which permits an electric motor winding action of a camera by operating a button. Such button is provided on the drive device and is equivalent to a shutter release button or a release button, operating after the start of the camera and completion of a photographing operation.

Such approach has resulted from the increasing application of electronics to the control circuits of cameras and from the design of the starting action of a camera by an electrical releasing method using an electromagnet instead of a mechanical release mechanism. This arrangement permits operation with a soft touch, continuous photographing, external remote control, etc. and is advantageous for various kinds of photographing camera systems.

An electrical motor drive device, irrespective of whether it is incorporated in a camera or used as accessory thereto, permits control of starting action when timing information on the completion of a photographing operation is received as an electrical signal. This, in turn, permits electrical control over signal operation on the side of the camera and is highly advantageous for various applications of electronics in cameras.

For such applications, however, the following problem with the conventional devices has arisen. In order to form an input signal for a release operation member or the like of the camera, a switch is operated by a camera operator for photographing, irrespective of whether the switch is a mechanical switch or a solid switch using a conductive rubber. The camera operators, however, have different personal habits, peculiarities or inclinations. Some of them operate quickly and some tend to operate incompletely. The switch is thus operated in an infinite variety of ways.

For example, consider a case where an operator pushes a camera starting button 1 to operate a dual switch S as shown in FIG. 1 of the accompanying drawings. Then, even when contacts Sa and Sb are brought into contact with each other by the first stage stroke of a depressing operation on the button 1, there first takes place a chattering phenomenon which causes a transient signal to be formed corresponding to the speed of operation on the button 1 and also to the surface conditions of the contacts Sa and Sb before a signal based on normal contact between the contacts Sa and Sb is produced. The same phenomenon also takes place when the contact Sb is brought into contact with another contact Sc by the second stage stroke of the button depressing operation. In this manner, when an operation switch of such a type is used, there are produced transient chattering signals not only in the depression movement but also in the button return movement of the button depressing operation.

Now, assume that a starting button of a camera or of an electric motor drive device is arranged such that, after a light measuring action of the camera is performed in response to a signal e1 obtained from contact made between the contacts Sa and Sb of the switch S and after the release of a shutter to perform a photographing operation in response to a signal e2 obtained from contact made by the contacts Sa, Sb and Sc of the switch S, a wind-up action is performed by an electric motor drive action taken in response to a signal e3 produced as shown in FIG. 2. The chattering takes place when the finger F of the operator moves upward. Under this chattering condition, the electric motor drive is rendered intermittent by the signal e3 or, if the vibration of the chattering is quick, no wind-up action would be performed at all and only a queer sound would be produced from a motor of the device. Conversely, if the vibration of the chattering is slow, the wind-up action would be effected only halfway. In any case, it has been impossible to expect a smooth wind-up action under such a condition. With a wind-up action effected halfway in this manner, an intermittent driving action causes a winding mechanism to vibrate. Then the vibration is transmitted to the finger F to accelerate the chattering and, thus, a satisfactory wind-up operation becomes hardly possible.

A second problem with the conventional electric motor drive devices also exists. This problem occurs when a control circuit which is provided for controlling the drive action of a motor is arranged to use a driving power source of the motor in common therewith. The power source voltage varies when a large driving current flows to the motor. Accordingly, this variation in the power source tends to cause the control circuit to operate erroneously. When a battery is used as a power source, limitation of available space forbids use of a battery of large capacity. Therefore, a great degree of power is consumed for driving the motor and this causes a decrease in the electromotive force of the battery. In addition to this, the voltage drop which takes place when the motor is driven makes it impossible to have a sufficient supply of power to the control circuit. Under such circumstances, there is a high probability that a variation in the battery voltage might be mistaken for an input signal. Under such a condition, therefore, an accurate control action of the control circuit may likely occur.

The present invention is directed to the elimination of these shortcomings of the conventional electric motor drive devices.

SUMMARY OF THE INVENTION

It is therefore an object of this invention to provide an electric motor drive device which eliminates the shortcomings of the conventional devices. The arrangement of the invention is that, in a control circuit which forms a signal for controlling electric motor drive action, there is provided a memory circuit. Further, storing of a memory in the memory circuit and removal of the memory are performed by the first stage operation and the second stage operation on a starting operation member in its depressing and returning movements.

It is another object of the invention to provide an electric motor drive device which is characterized in that a constant voltage circuit is provided in a power supply circuit provided for a driving control circuit to ensure that no erroneous action will be caused by variation in the power source voltage of a power source when a motor is driven.

It is a further object of the invention to provide an electric motor drive device which is characterized in that power supply to the control circuit thereof is arranged to be effected only when the circuit is in a control mode so as to avoid unnecessary power consumption.

In accordance with the invention, an electric motor drive device for a camera comprises an operation switch operatively interlocked with a starting operation member, a memory circuit which memorizes the operated movement of the operation member responsive to the output of the operation switch and an electric motor control circuit which is controlled by the output of the memory circuit. A motor driven by the device is brought into an inhibited state in response to an operation switch signal produced by the operation of the operation member. The memory circuit is inverted to release the motor from the inhibited state so as to bring the motor into a driven state in response to another operation switch signal produced during a returning movement of the operation member.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 4 illustrates signals of the control circuit shown in FIG. 3;

FIG. 5 illustrates an operating condition of the device of FIG. 3 as used for a non-continuous photographing operation.

DETAILED DESCRIPTION OF THE PREFERRED EMBODIMENTS

Figure 3:
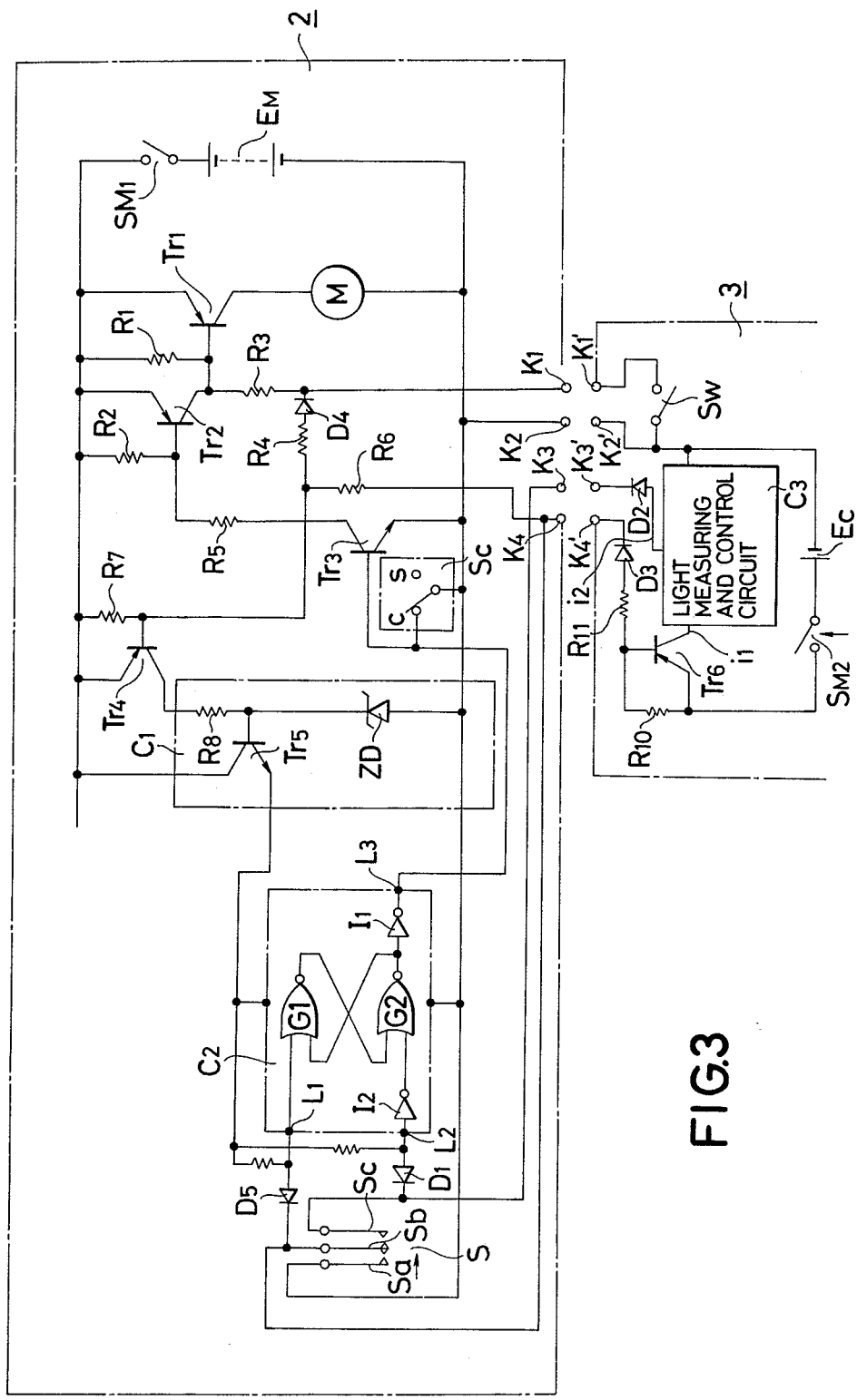
FIG. 3 is an electrical circuit diagram showing the present invention as applied to an electric winding device for a camera for winding-up a film and a shutter.

In FIG. 3, a block 2 represents an electrical circuit of an electric winding device for a camera arranged as an electric motor drive device to be used as an accessory and to be mounted on the camera before use. A motor M is interlocked through a reduction gear mechanism (which is not shown) with a shutter winding mechanism and a film winding mechanism provided within the body of the camera. Detailed description on structural arrangement relative to the motor M is omitted herein, because the driving mechanism which is ancillary to the motor M and the mechanism required for its driving connection with the camera body can be arranged in the same manner as those of the conventionally known electric motor drive devices.

A reference symbol EM indicates a power source battery provided on the side of the winding device. Element SM1 indicates a power source switch. Element Tr1 is a transistor which has its collector and emitter connected to a power supply circuit of the motor M. Element Tr2 indicates a control transistor which has its collector connected to the base of the transistor Tr1. Element Tr3 indicates a transistor which has its collector connected to the base of the transistor Tr2. Element SC indicates a mode selection switch which is connected to the base side of the transistor Tr3. In the mode selection switch SC, a fixed contact C is provided for operating the winding device in a continuous driving mode in which a camera starting action, a photographing action and a winding action are performed in a repeating manner. Another fixed contact S is provided in mode selection switch SC for a non-continuous driving mode, in which a camera starting action, a photographing action and a winding action are performed in a non-repeating manner when an operation switch (which will be described hereinafter) is depressed once for each photographing operation.

In the mode where the switch SC is connected to the contact C, the transistor Tr3 is forcedly turned off. This causes the transistor Tr2 to be turned off also. Then, when a photographing completion switch SW (which will be described hereinafter) is turned on, the transistor Tr1 is turned on to continue the supply of power to the motor M and there takes place the above stated continuous driving mode. A transistor Tr4 is a power supply control transistor which is energized and controlled either by an operation switch (which will be described hereinafter) or by a winding completion switch of the camera. A resistor R8, a constant voltage diode ZD and a transistor Tr5 form a constant voltage circuit C1. A reference symbol C2 indicates a memory circuit. In this embodiment, the memory circuit C2 includes an RS flip-flop circuit, which is formed by NOR gates G1 and G2 and inverters I1 and I2.

Figure 1:
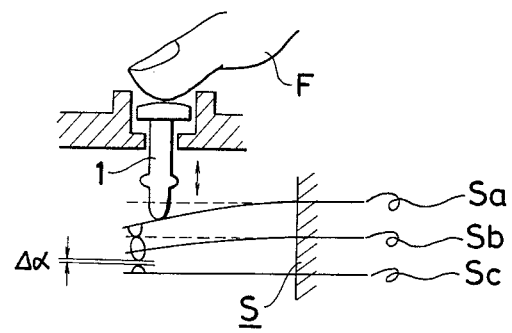
FIG. 1 is a schematic representation showing the essential parts of an operation switch to which the present invention applies.
Figure 2:
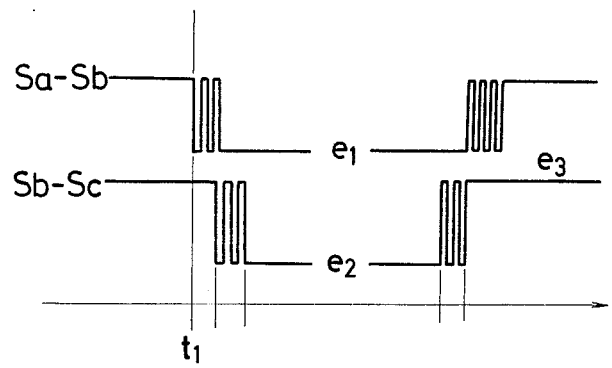
FIG. 2 illustrates an operating condition of the switch shown in FIG. 1.

An operation switch S is a dual switch wherein, as shown in FIG. 1, contacts Sa and Sb are brought into contact with each other by the first stage operation of the switch. The second stage operation of the switch brings contacts Sa, Sb and Sc into contact with each other. In the returning movement of the operation, the contacts Sb and Sc move away from each other in the first stage returning movement and then the contacts Sa and Sb move away from each other in the second stage returning movement of the operation. Reference symbols D1–D5 indicate reverse current-preventing diodes while R1–R7, R10 and R11 respectively indicate bias resistors and current limiting resistors.

Figure 6:
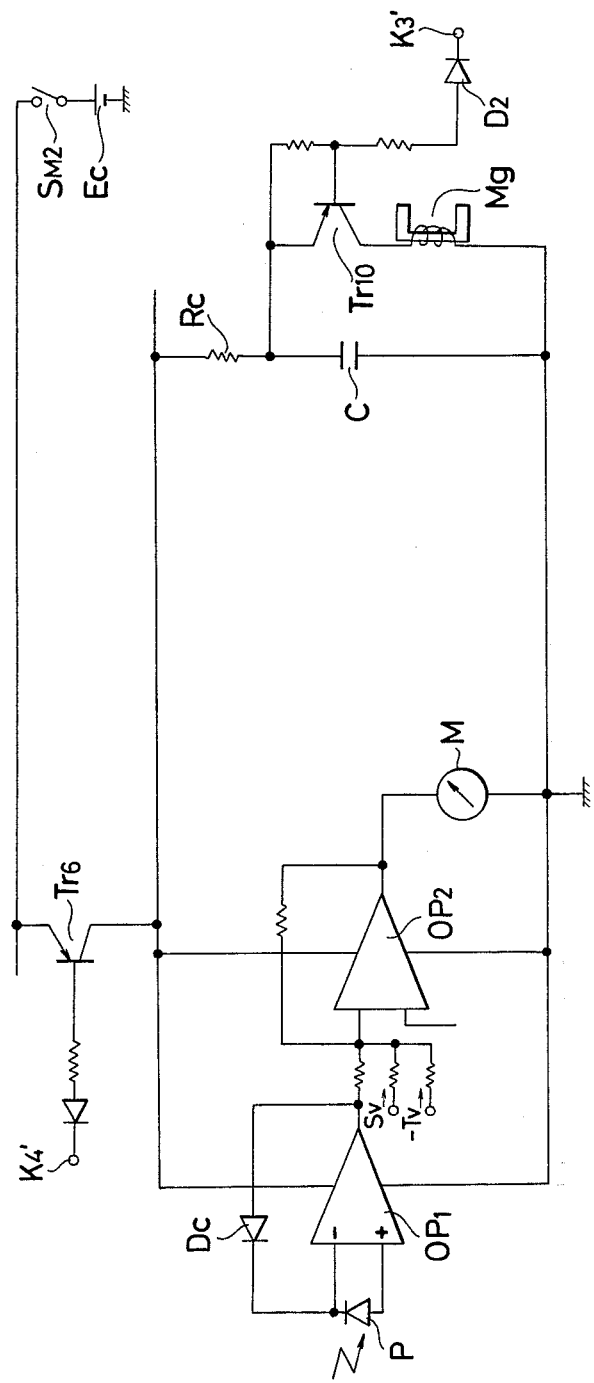
FIG. 6 illustrates, by way of example, a light measurement control circuit and an electromagnet driving circuit shown in FIG. 3.

A block 3 represents a control circuit provided on the side of the camera body. The control circuit is coupled with the circuit 2 of the winding device by the terminals K1'–K4' which are arranged on the side of the camera body through connection terminals K1–K4 arranged on the side of the winding device. A light measurement control circuit C3 is provided with input terminals i1 and i2. A light measuring circuit arranged within this circuit becomes operative when power is supplied by way of a transistor Tr6, which is connected to the input terminal i1, turned on. With the light measuring circuit rendered operative by the power supply, a light measurement output of the light measuring circuit is supplied to an exposure control circuit which is not shown but is provided in the camera body. The other input terminal i2 of the light measurement control circuit C3 is connected to the terminal K3' through the reverse current-preventing diode D2. With this arrangement, when the contacts Sb and Sc are shifted from an "off" state to an "on" state, as will be further described hereinafter, an electromagnetic driving circuit which is connected to the inside of the circuit C3 operates to excite an electromagnet which actuates the camera by releasing a release mechanism thereof. Further details of the circuit C3 are omitted from description herein as the invention is not directly related to such details of the light measurement control circuit C3. Such circuit is shown in FIG. 6.

A winding completion switch SW which is provided within the control circuit 3 is turned on by completion of a photographing action and is turned off by completion of a wind-up action. The switch SW is disposed, for example, within a mechanism which is interlocked with a shutter closing diaphragm.

A power source switch SM2 is provided on the side of the camera body while there is provided a power source battery EC on the camera side. Further, on the camera body side, a release switch which is similar to the operation switch S provided on the side of the winding device is disposed within the control circuit 3 in parallel with the operation switch S. The release switch is interlocked with the release button of the camera and is connected between the connection termimals K2' and K4' and between K2' and K3'. However, the details of the release switch are omitted herein for the convenience of illustration. Such construction is well-known, for example, from U.S. Pat. No. 4,068,243.

The operation of the arrangement described in the foregoing is as described below:

When the operation switch S is operated with the mode selection switch SC shifted to the contact S so as to be in the non-continuous photographing mode, the first stage stroke of the depressing operation of button 1 causes the part between the contacts Sa and Sb to close (see FIG. 1). This causes the contact Sb to have a low level L. Now, assume that the contacts Sa and Sb form a switch S1. When the switch S1 is turned on, the first stage in the depressing operation (step I→step II) causes an input terminal L1 of the flip-flop circuit to change from a high level to the low level L as shown in FIGS. 4 and 5. Meanwhile, however, the output terminal L3 of the circuit C2 remains at the low level L. The output of the switch S1 causes the transistor Tr6 to be turned on through the terminal K4' provided on the camera side and a light measuring action is made. Since, at this time, the level of an output from an output terminal L3 is still kept at a low level even at step II, the transistor Tr3 is in an "off" state. Further, at this time, the winding completion switch is off. Accordingly, the transistor Tr1 is in an "off" state and the motor M is not driven.

Since the flip-flop is insensitive to a chattering signal, even if there occurs a chattering phenomenon at step I, no driving current flows to the motor M. Further, the transistor Tr4 is turned on by the above stated first stage operation to render the constant voltage circuit C1 operative. Therefore, power supply to the flip-flop circuit is effected only when the operation switch S is depressed.

When the button 1 is further depressed to perform the second stage operation, the contacts Sb and Sc come into contact. Assuming that the contacts Sa, Sb and Sc now form a switch S2, the switch S2 is then turned on to cause the other input terminal L2 of the flip-flop circuit to change from the high level H to the low level L. As a result of this, the flip-flop circuit is inverted and the output of the output terminal L3 becomes the high level H to turn on the transistor Tr3. With the contacts Sa, Sb and Sc thus having been connected to each other, a releasing electromagnet (not shown) provided on the camera side is excited so as to permit the camera to begin a photographing operation, which is completed, through exposure, a predetermined period of time later. When the switch SW is turned on upon completion of the photographing operation, the transistor Tr2 which, by transistor Tr3 being turned on, has been rendered ready to be turned on, is turned on. Meanwhile, the transistor Tr1 which is inhibited from coming into an "on" state is kept in its "off" state. When the button 1 is caused to make its returning movement, the contacts Sb and Sc are first separated from each other at the step IV in the first stage of the returning movement. At the step IV, the condition of the flip-flop circuit remains unchanged even when the input terminal L2 changes from the low level to the high level. Therefore, there occurs no change and no erroneous action even if a chattering signal mixes between the contacts Sb and Sc.

During a transient period from the step IV to the step V in the second stage of the returning movement which is performed by allowing the button 1 to return even further, the contacts Sa and Sb separate from each other. Then, the input terminal L1 changes from the low level to the high level. The flip-flop circuit is inverted by this change and the output of the output terminal L3 changes from the high level H to the low level L. This change in the output of the flip-flop circuit changes transistor Tr3 from its "on" state to an "off" state. Even if there arises chattering between the contacts Sa and Sb then, the flip-flop circuit is insensitive to the remainder of the chattering because the flip-flop circuit is inverted by the signal which causes the change from the low level to the high level and, once the part between the contacts Sa and Sb is turned off, the flip-flop is never inverted so as to have the high level H at the terminal L3 as long as the part between the contacts Sb and Sc is not turned on.

With the transistor Tr3 thus having been turned off, the transistor Tr2 is turned off to release the transistor Tr1 from being inhibited from assuming its "on" state. Therefore, the motor M is started and is driven until the switch SW is turned off by completion of a winding action.

In the case of the continuous winding mode, when the selection switch SC is shifted to the contact C, this forcibly turns off the transistor Tr3 so as to bring the motor M into a continuous driving state irrespective as to the change or the lack of change in the condition of the flip-flop circuit and a continuous photographing operation is performed according to the on-and-off operation of the winding switch SW.

The power source battery EM has a higher voltage than the battery EC which is provided on the side of the camera. In the memory circuit in the flip-flop part, there are arranged the constant voltage diode ZD, etc. to supply a voltage of low stable level through a constant voltage circuit C1. This arrangement ensures that no voltage variation takes place in the memory circuit when the motor M is driven. Meanwhile, the diodes D1–D4 are arranged to prevent a signal of high level from the power source battery EM from being impressed on the camera side due to difference in voltage between these power source batteries, so that circuits provided on the camera side will not be affected by the impression of such a high level signal.

In the foregoing description, the operation switch S is provided on the side of the winding device and the description has covered the operation as performed when the operation switch S is operated. However, when an operation switch similar to this switch S is provided and operated on the camera side instead of on the winding device side, the results of the operation will be exactly the same as those described in the foregoing.

Further, the operation switch is not limited to the above stated mechanical switch but the same results can be obtained by the use of a switch of different type such as a conductive rubber switch, a magnetism sensitive switch, etc.

FIG. 6 shows an example of the light measurement control circuit shown in FIG. 3 and also shows, by way of example, an electromagnet driving circuit. In FIG. 6, a photosensitive element P receives a light from an object to be photographed. The photosensitive element P is connected to the inverting and non-inverting input terminals of an operational amplifier OP1. A diode DC is connected to the input and output feedback route of the operational amplifier OP1. Another operational amplifier OP2 is arranged to have the output of the operational amplifier OP1 impressed on its inverting input terminal. Simultaneously, information Sv relating to the sensitivity of film and information Tv relating to shutter time respectively formed as electrical signals by setting circuits (which are not shown) are also impressed on the inverting input terminal of the operational amplifier OP2.

Meanwhile, a signal of constant level is impressed on a non-inverting input terminal of the operational amplifier OP2. An exposure member M is connected to an output terminal of the operational amplifier OP2. The pointer of the meter forms an EE device in combination with a pointer detecting device which is interlocked with a diaphragm device. The aperture size of the camera is automatically adjusted by this arrangement. However, further details of this arrangement are not directly relevant to the present invention and, therefore, are omitted from the ilustration. There is provided a capacitor C which is arranged to accumulate an electrical energy required for forming a releasing force. A reference symbol Tr10 indicates a transistor which has its emitter connected to the capacitor C and its base to the terminal K3' through a diode D2. There is provided an electromagnet $M_g$ which is interlocked with a release mechanism of the camera.

In FIG. 6, when the release button is depressed, a signal from the terminal K4' turns the transistor Tr6 on. Then, a current from the battery EC charges the capacitor C through a resistor RC and, at the same time, supply of power is made to to the light measurement control circuit which comprises the operational amplifiers OP1 and OP2 so as to bring the circuit into an operating state.

As a result of this, suppressed information Bv on the brightness of an object to be photographed is obtained from the output terminal of the operational amplifier OP1 through the photosensitive element P. The information Bv is subjected to addition computation together with the information values Sv and Tv which are supplied to the input side of the operational amplifier OP2. Through this addition computation, information Av relating to an aperture value which gives correct exposure is obtained from the output of the operational amplifier OP2 and the pointer of the exposure meter M deflects according to this value. When the release button is depressed to the second stage position, the transistor Tr10 is turned on through the diode D2. Then, the energy accumulated at the capacitor C energizes the electromagnet Mg to actuate the release mechanism (not shown) of the camera. Simultaneously, a diagram aperture on the camera side is automatically adjusted to a correct aperture value by the meter M and exposure begins. The operation after completion of exposure has already been described in the foregoing.

Further, in the embodiment above, the motor is connected to the transistor Tr1, i.e., to the output terminal of the winding motor control circuit and the winding mechanism on the camera side is arranged to be driven by the motor. However, the present invention is not limited to such arrangement. In place of the motor, an electromagnetic clutch interposed in between the winding mechanism and a motor which is driven by a depressing operation of the release button may be connected to the output terminal of the winding motor control circuit in such a way that film winding, stopping of the winding action halfway, etc., can be accomplished through an intermittent operation of the clutch as desired.

As described in the foregoing, in accordance with this invention, a memory circuit which memorizes an operation condition in the process of the operation of the operation switch and which erases the memory during the returning movement of the operation switch is employed as a control circuit. With this arrangement, the possibility of erroneous action due to a chattering signal produced during an operation of the operation switch is eliminated so as to permit accurate driving control. In addition to this advantage, with the control circuit serving as an interface circuit, the operative coupling of the motor driving circuit and the operation switch with the camera body and the control circuit provided in the camera is facilitated. The invention is highly advantageous for application to a compact camera and for the practical application to an electric motor drive device.

It is another advantage of the invention that, since the control circuit is arranged to have power supplied only when the operation switch is in action, unnecessary consumption of power can be avoided. Further, with the constant voltage circuit provided in the control circuit, the possibility of erroneous action due to voltage variation which occurs when the motor is driven can be eliminated.

While the foregoing description and drawings represent the preferred embodiments of the present invention, it will be obvious to those skilled in the art that various changes and modifications may be made therein without departing from the true spirit of the present invention.

What is claimed is:

1. An electric motor drive device for a camera which includes a light measuring circuit and an electromagnetic release device, comprising:

starting operation means having a depressing movement and a returning movement which depressing movement has a first stage depression range and a second stage depression range in the operation thereof, said means being provided with switching means arranged to produce an electrical signal at each of said ranges first for actuating the light measuring circuit and then for actuating the electromagnetic release device;

a memory circuit responsive to the output of said starting operation means for producing a first output signal indicating a first state in response to an electrical signal produced in the second stage range and a second output signal indicating a second state in response to an electrical signal produced in the first stage range when said starting operation means returns, wherein said memory circuit successively memorizes the first and the second states; and an electric motor control circuit which is connected to an electric motor which performs a winding action of the camera and is connected also to said memory circuit, said motor control circuit being arranged to inhibit driving of the motor in response to said first output signal from said memory circuit and to drive the motor in response to said second output signal from said memory circuit.

2. An electric motor drive device for a camera according to claim 1 wherein said memory circuit is provided with a semiconductor switch for effecting supply of power to said memory circuit, and including means coupled to said semiconductor switch to bring said semiconductor switch into an "off" state upon completion of an electric motor drive action and into an "on" state upon completion of a photographing operation.

3. An electric motor drive device for a camera according to claim 1 wherein, in a power supply circuit of said memory circuit, there is provided a constant voltage circuit, said memory circuit being arranged to be operated through said constant voltage circuit by a single power source provided for driving said motor.

4. A photographic camera system comprising:
(A) a photographic camera including:
(a) an electromagnetic release device which is provided with a control circuit;
(b) a light measuring circuit; and
(c) starting operation means which has a first stage depression range and a second stage depression range in the operation thereof, said means being provided with switching means arranged to produce an electrical signal at each of said ranges first for actuating said light measuring circuit and then for actuating said electromagnetic release device; and (B) an electric motor drive device including:
(a) a memory circuit which is responsive to said electrical signals produced by said switching means and is arranged to produce a first output signal indicating a first state in response to an electrical signal produced in the second stage range and a second output signal indicating a second state in response to an electrical signal produced in the first stage range when said starting operation means returns, wherein said memory circuit successively memorizes the first and the second states; and
(b) an output control circuit which is connected to winding means which performs a winding action of the camera and is connected also to said memory circuit, said output control circuit being arranged to inhibit driving of the winding means in response to said first output signal from said memory circuit and to drive the winding means in response to said second output signal from said memory circuit.

5. A photographic camera system according to claim 4, wherein said memory circuit is composed of a flip-flop circuit.

6. A photographic camera system according to claim 4, wherein said electric motor drive device further includes mode selection means which permits selection of either one of two different modes including a continuous operation mode and a non-continuous operation mode, said means being arranged to be connected to said output control circuit in said continuous operation mode to forcibly bring said output control circuit into an operative condition thereof irrespective of the state of said memory circuit.

7. A photographic camera system according to claim 6, wherein said winding means is an electric motor.

* * * * *